United States Patent
Assarabowski et al.

(10) Patent No.: US 6,797,421 B2
(45) Date of Patent: Sep. 28, 2004

(54) METHOD AND APPARATUS FOR PREVENTING WATER IN FUEL CELL POWER PLANTS FROM FREEZING DURING STORAGE

(75) Inventors: Richard J. Assarabowski, Vernon, CT (US); William T. Unkert, Tolland, CT (US); Leonard A. Bach, West Hartford, CT (US); Albert P. Grasso, Vernon, CT (US); Benoit Charles Olsommer, Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 69 days.

(21) Appl. No.: 10/043,791

(22) Filed: Jan. 11, 2002

(65) Prior Publication Data
US 2003/0134168 A1 Jul. 17, 2003

(51) Int. Cl.[7] .............................................. H01M 8/12
(52) U.S. Cl. ............................ 429/26; 429/12; 429/13; 429/20
(58) Field of Search ............................ 429/12, 13, 20, 429/26

(56) References Cited

U.S. PATENT DOCUMENTS

| | | | |
|---|---|---|---|
| 5,753,383 A | 5/1998 | Cargnelli et al. ............... | 429/13 |
| 6,103,410 A | 8/2000 | Fuller et al. .................... | 429/13 |
| 6,248,462 B1 | 6/2001 | Bonville ......................... | 429/24 |
| 6,294,149 B1 * | 9/2001 | Autenrieth et al. ......... | 423/648.1 |
| 6,489,052 B1 * | 12/2002 | Acker ............................ | 429/40 |
| 2002/0058165 A1 * | 5/2002 | Gebhardt et al. .............. | 429/13 |

FOREIGN PATENT DOCUMENTS

| | | | | |
|---|---|---|---|---|
| EP | 1 113 516 A1 | | 7/2001 | |
| JP | 59-152210 | * | 8/1984 | ........... C01B/23/00 |
| WO | WO 00/33407 A1 | | 6/2000 | |
| WO | WO 01/03215 A1 | | 1/2001 | |
| WO | WO 01/48846 A1 | | 7/2001 | |

* cited by examiner

Primary Examiner—Dah-Wei Yuan
(74) Attorney, Agent, or Firm—Stephen A. Schneeberger

(57) ABSTRACT

A keep warm system for a fuel cell, power plant (10), typically of the PEM type, prevents freeze-sensitive portions of the power plant, such as the cell stack assembly (CSA) (12) and the water management system (28, 30), from freezing under extreme cold external temperatures, during extended storage (CSA shut-down) periods. Pre-stored and pressurized fuel, typically hydrogen (25), normally used to fuel the anode (16) of the CSA, is used as fuel for a catalytic oxidation reaction at a catalytic burner (66) to produce heated gas that convectively passes in heat exchange relation with the freeze sensitive portions (12, 28, 30) of the power plant (10). The convective flow of the heated gases induces the air flow to the burner (66), obviating the need for parasitic electrical loads. Thermal insulating means (64) substantially enclose the freeze-sensitive CSA (12) and/or the water management system (28, 30), and the convective flow of the heated gas from the catalytic burner (66), to improve system thermal efficiency.

20 Claims, 2 Drawing Sheets

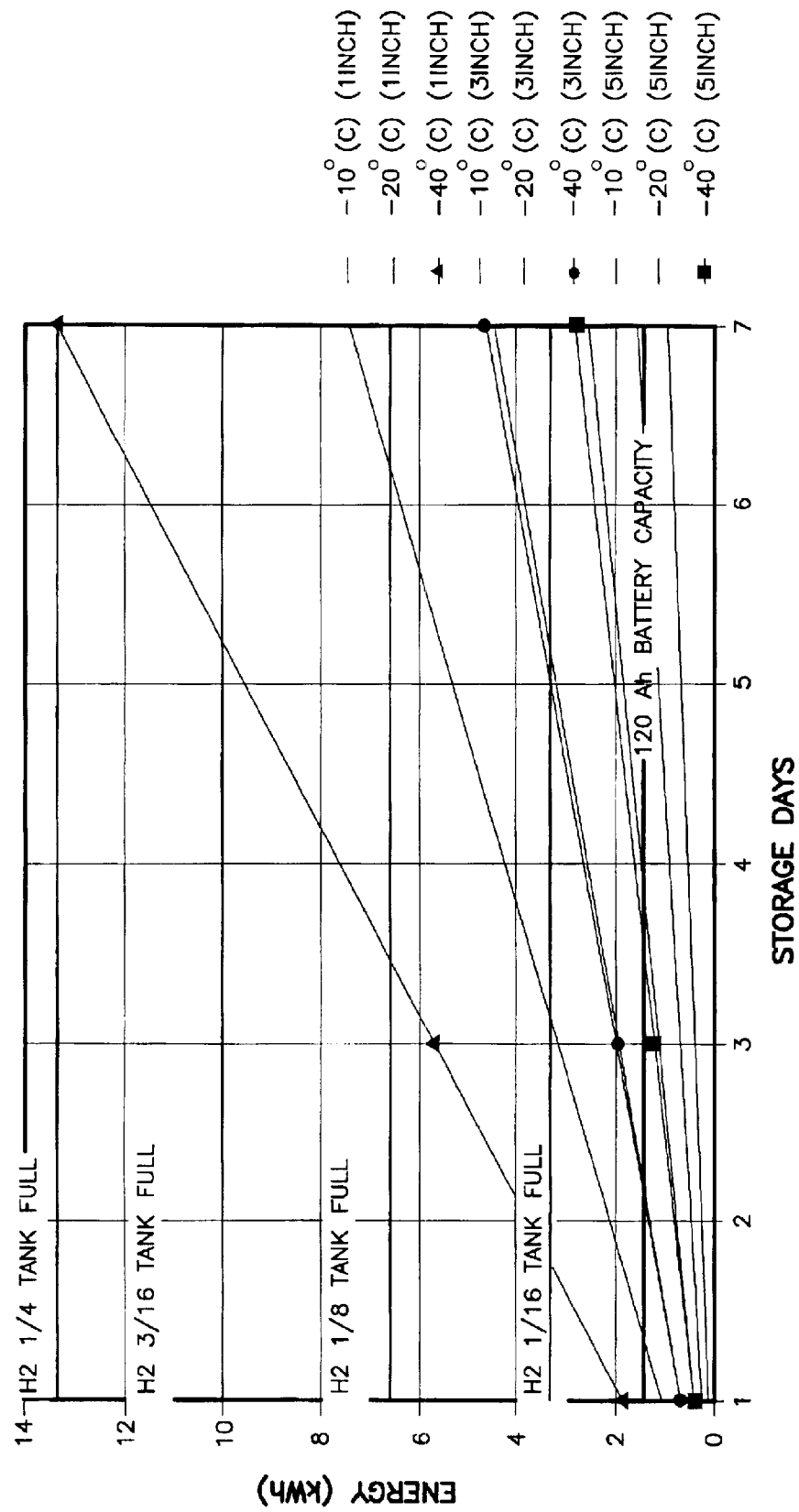

METHOD AND APPARATUS FOR PREVENTING WATER IN FUEL CELL POWER PLANTS FROM FREEZING DURING STORAGE

TECHNICAL FIELD

This invention relates to fuel cells, and particularly to fuel cell power plants suited or intended for use in transportation vehicles, or as portable or stationary power plants. More particularly still, the invention relates to a method and apparatus for preventing water in fuel cell power plants, and particularly proton exchange membrane (PEM) type fuel cell power plants, from freezing during periods of inactivity and storage.

BACKGROUND ART

Fuel cell power plants are commonly used to produce electrical energy from oxidizing and reducing fluids, such as oxygen, or air, and hydrogen, respectively. The electrical energy may be used to power electrical apparatus in a variety of environments, including in space vehicles, in land-based vehicles, and/or in a variety of other stationary and mobile applications. In such power plants, a plurality of planar fuel cells are typically arranged in a stack which receives and/or provides flows of a reducing reactant, such as hydrogen, an oxidant reactant, such as oxygen or air, coolant and product fluids. Each individual cell generally includes an anode electrode receiving the hydrogen reactant, a cathode electrode receiving the oxidant reactant, and an electrolyte, such as a proton exchange membrane (PEM), between the anode and cathode electrodes. Each cell typically also includes associated structure for the introduction, flow through and/or removal of coolant and product fluids, such as water.

While having important advantages, fuel cells and particularly PEM cells, also have limitations related to liquid water transport to, through, and away from the cell. Use of such fuel cells to power a transportation vehicle or other apparatus in a cold environment gives rise to additional concerns associated with water management, such as preventing mechanical damage occasioned by the freezing of the product water and/or any water coolant fluid, and minimizing the inconvenience of re-starting delays in the event of such freezing of product water and/or water coolant fluid. For applications in which a fuel cell power plant powers a vehicle, there is a general requirement that they be capable of startup and drive away in subfreezing ambient conditions as severe as −40° C. within 10 seconds, and no permanent damage from a hard freeze to −50° C. The startup condition cannot be met if ice forms during storage, which must be thawed prior to boot-strap starting using only internal power.

One approach to providing a freeze tolerant fuel cell power plant is described in U.S. patent application Ser. No. 09/935,254 filed Aug. 22, 2001 for "Freeze Tolerant Power Plant", which application is assigned to the assignee of the present application and is incorporated herein by reference. In that application, a water displacement system having a freeze tolerant accumulator that contains a water immiscible fluid and water coolant is employed for removing water in cooling channels at shutdown. Some provision is made for preventing freezing of water coolant for short periods of shutdown by supplemental heating of the water immiscible fluid. However, for shutdowns for an extended period, i.e., "storage" of more than several days during subfreezing weather, the water content in the accumulator portion of the system freezes and requires excessive time and energy to be melted for startup.

Another approach to the maintenance of a suitable operating temperature in the cell stack assembly during periods of cold ambient temperatures, at least during operation, brief shutdown, and restart, is described in PCT International Application PCT/CA00/01500, published Jul. 5, 2001 with Publication Number WO 01/48846 A1, entitled Method and Apparatus for Increasing the Temperature of a Fuel Cell Stack. That application describes combusting fuel reactant and oxidant reactant within either the coolant flow pathway or a reactant flow pathway to heat the stack assembly to a desired temperature during operation, brief shutdowns and/or for restarts. Keep warm methods that include stack components may be desirable in some circumstances, but generally require more complex, and therefore costly, control schemes. The more stringent requirements are needed to protect stack components from excessive temperatures or other extreme conditions that could cause irreparable damage. Because of their complexity, such approaches would also be more energy demanding and therefore would require greater fuel consumption which limits the storage protection time available.

Even though the energy required to melt the amount of ice expected from a hard freeze can be obtained from stored fuel reactant, such as $H_2$, the power needed to melt it so positive power can be generated within 10 seconds exceeds the power rating of the power plant itself. If the fuel reactant is to be used directly for heat by combustion, the heat needed for such rapid melting could damage the system and would be a serious drain on the fuel supply.

Accordingly, it is an object of the invention to provide an arrangement that will enable a fuel cell power plant to generate power rapidly, even following shutdown storage for relatively long intervals under very cold conditions.

It is a further object of the invention to afford the aforementioned capability using the fuel cell fuel source.

It is a still further object of the invention to afford the aforementioned capability in a fuel-efficient manner.

DISCLOSURE OF INVENTION

The present invention provides a keep-warm system for a fuel cell power plant. The fuel cell power plant may include a PEM-type fuel cell stack assembly (CSA) having anode(s), cathode(s), proton exchange membrane(s), and a cooler, typically a water transport plate(s). However, the keep warm system can apply to any type of fuel cell power plant that contains components and/or fluids that are subject to freezing at temperatures in the −50° C. range. The power plant further includes means, such as a storage tank of hydrogen, for supplying a hydrogen-rich fuel, such as hydrogen, at least to the anode, and a source of oxidant reactant, such as air, for supplying the cathode. A water management system is included with the power plant. In accordance with the keep-warm system of the invention, there is also provided one or more thermal insulating enclosures for the power plant, including the CSA and the water management system, as well as a catalytic burner for convectively supplying heat to the insulating enclosures and the power plant components therein. The stored hydrogen is selectively used to fuel the catalytic burner. The hydrogen is fed to the catalytic burner where it mixes with a supply of air and contacts a catalytic surface of the burner to effect a flameless oxidation reaction that releases heat at a moderate temperature, typically in the range of 200°–700° F. The heat is contained in the combusted gas and is carried by convection, into and through the insulating enclosures to exchange heat and warm the freeze-sensitive components of the power plant contained therein. That convective heat is the principal source of keep warm heating.

The rate of flow of hydrogen fuel and air to the catalytic burner need not be large, and is readily provided by selective feed of the pre-pressurized hydrogen from storage and the associated induction of ambient external air resulting from the convective flow of the heated gas. The flow of hydrogen to the burner, and thus, at least in part, the resultant heat provided, is governed by regulating the flow rate and/or flow intervals as a function of temperature, typically sensed at or near the freeze-sensitive components requiring protection from freezing. That temperature threshold, or control temperature, is typically about 5° C. (40°–45° F.)

The CSA and the water management system may be located in a common thermal insulating enclosure and may be arranged for optimal utilization of heat contained in the convectively conveyed gases which pass thereby, or there through, in heat exchange relation. Alternatively, there may be multiple insulating enclosures each containing different parts of the power plant, and appropriate interconnection passages for flow of heated gas there between. There may also be various heat exchangers for the heated gas, to the extent required. Appropriate venting for cooled exhaust gas and drainage for condensation from that cooling, are provided.

The forgoing arrangement of pressurized hydrogen, induced air, catalytic burner, convective heat flow, and insulated enclosure(s), provides sufficient heat to the power plant to keep it from freezing for an extended "storage" period. Using only stored hydrogen and substantially no electrical power to drive parasitic loads, such as pumps and/or blowers, that storage period may be 7 days or more, depending upon the external temperatures and the supply of hydrogen available. While the power plant is described as being a hydrogen-fueled unit, the keep warm approach can also with other types of gaseous or light liquid fuels such as gasoline. In the case of gasoline, the burner system would require the addition of a fuel vaporizer in order to vaporize the gas before it reaches the catalytic burner.

The foregoing features and advantages of the present invention will become more apparent in light of the following detailed description of exemplary embodiments thereof as illustrated in the accompanying drawings.

BRIEF DESCRIPTION OF DRAWINGS

FIG. 2 is a graphical depiction of the fraction of a typical hydrogen fuel tank required to maintain a fuel cell stack assembly from freezing for differing intervals and at several sub-freezing temperatures.

BEST MODE FOR CARRYING OUT THE INVENTION

Figure 1:
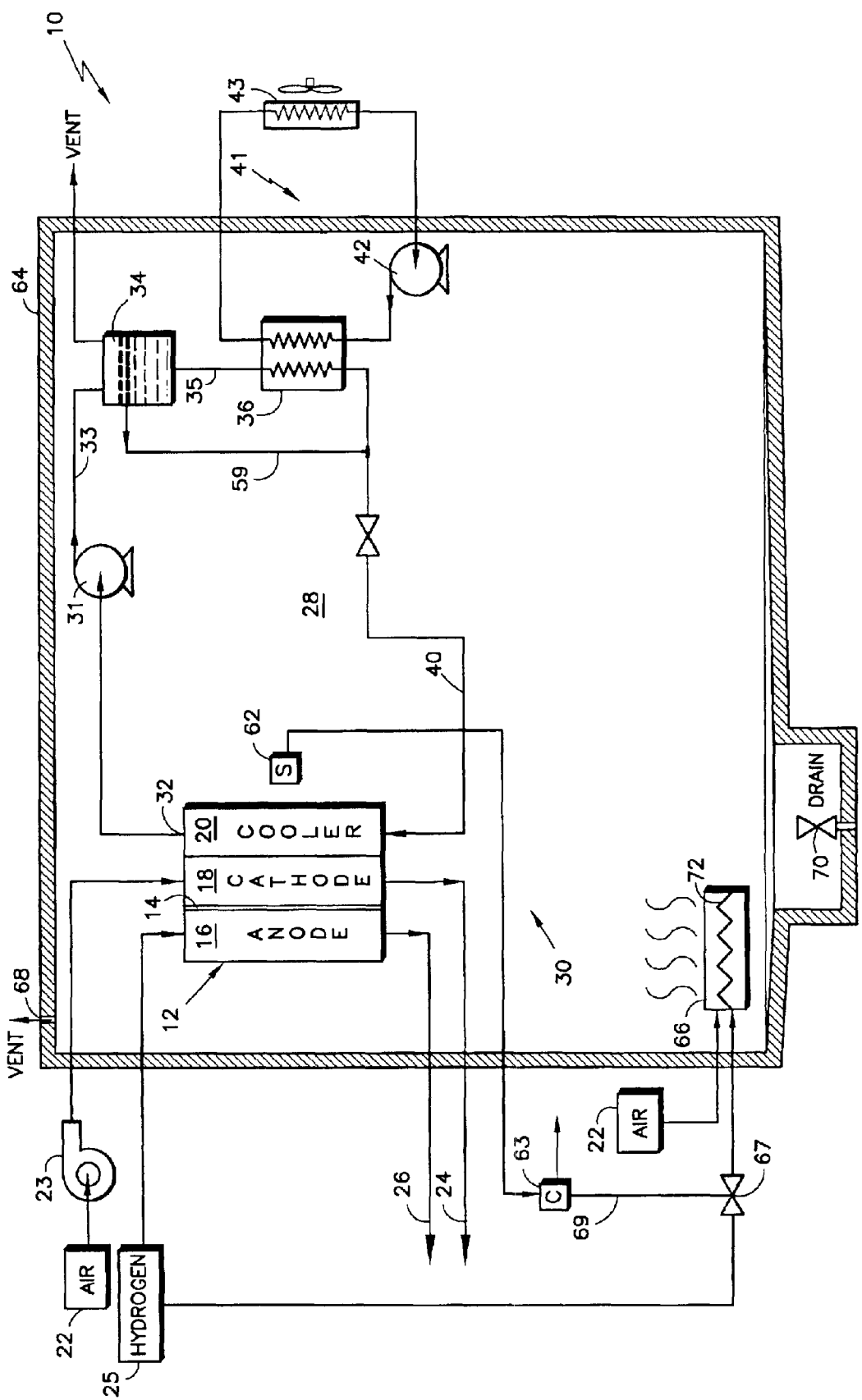
FIG. 1 is a schematic diagrammatic representation of a keep-warm system for a fuel cell power plant constructed in accordance with the invention.

Referring to the drawings in detail, FIG. 1 depicts a freeze tolerant power plant 10 in general accordance with the invention. The power plant 10 of FIG. 1 is similar in many respects to the power plant described in the aforementioned U.S. patent application Ser. No. 09/935,254, to which reference may be made for additional detail. However, the invention finds application in other fuel cell power plants than just that to be described below, and should be so considered, as will become apparent. The power plant 10 includes a fuel cell stack assembly (CSA) 12 of one (as depicted here for simplicity), or typically multiple, fuel cells for producing electrical current from a reducing reactant, or fuel, and an oxidizing reactant, or oxidant, as are commonly known in the art. Each fuel cell of the CSA 12 includes an electrolyte 14, such as a proton exchange membrane (PEM), an anode 16 and a cathode 18 disposed adjacent opposite sides of the electrolyte 14. Adjacent to the cathode 18 is a cooler 20, which may be a water transport plate (WTP) in a PEM cell.

An oxidant supply 22 (labeled "Air" in FIG. 1) directs an oxidant reactant, such as air, via a blower 23, to and past the cathode 18, and out of CSA 12 via exhaust 24. A reducing reactant, or fuel, supply 25 (labeled "$H_2$" in FIG. 1) directs a reducing reactant, such as hydrogen gas, to and past the anode 16 and out of the CSA 12 via exhaust 26. The fuel supply 25 (hereinafter referred to as "hydrogen supply 25") may in fact be a supply of hydrogen-rich gas from a source such as propane, butane, natural gas, or the like, which will be referred to generally as "hydrogen". The hydrogen supply 25 is preferably a container (tank) of hydrogen stored under pressure. As noted earlier, this fuel supply could contain gasoline or other easily vaporized liquid fuel, as well. Fuel sources other than hydrogen will normally require a fuel processor to convert the fuel into a hydrogen-rich gas stream.

The cooler 20 is included as part of a primary coolant loop 28, which in turn is part of the coolant/water management system 30 of power plant 10. The primary coolant loop 28 also includes a coolant circulator, such as pump 31, located between a coolant exhaust outlet 32 from cooler 20 and a coolant feed passage 33 that pumps a water coolant through the coolant feed passage 33, through a gas separator 34 wherein any reactant gases trapped in the coolant are vented from the plant 10, and through a first extension 35 of the coolant feed passage 33 into a coolant heat exchanger 36. The water then passes through a second extension 38 of the coolant feed passage 33, then a third extension 40 of the coolant feed passage 33, and then back into the cooler 20.

The coolant heat exchanger 36 may be a liquid/liquid coolant heat exchanger, and also forms part of a secondary coolant loop 41 that includes a circulation pump 42 and a secondary coolant radiator and fan 43. The secondary coolant loop 41 may contain a traditional antifreeze solution, such as ethylene glycol, or the like, and water.

Small amounts of water remain in the CSA 12, including the cooler 20, and care must be taken to maintain that water and the water coolant in the separator 34 above freezing, at least for short-term storage such as overnight. This may be done, at least in part, by sensing ambient temperature conditions, as with one or more temperature sensors 62 strategically positioned at cold-sensitive locations in power plant 10 and connected to controller 63, and, when necessary and appropriate as determined and controlled by the sensor (s) 62 and controller 63, providing the requisite heat, as will be described.

In accordance with the invention, there is provided an insulating housing 64 which encloses, contains, and/or otherwise thermally insulates and isolates the power plant 10, or at least significant and critical portions thereof, and a catalytic burner 66 associated with insulating housing 64 to convectively provide an efficient source of supplemental heat. This combination of insulating housing 64 and catalytic burner 66 are employed to convectively provide heat to at least temperature-critical portions of the power plant 10 sufficient to maintain the power plant capable of start-up within 10 seconds, even after long term storage of, for instance, 7 or more days and under external ambient conditions as low as −40° C. The catalytic burner 66 is conveniently supplied with a hydrogen-rich fuel, such as the hydrogen gas from the $H_2$ source 25 for the fuel cell power plant 10, and an oxidant, such as the air source 22, and which is preferably either ambient or pre-pressurized air not requiring delivery by a "parasitic" pump or blower requiring power. The insulating housing 64 may be formed of any suitable thermal insulating material that provides adequate insulating properties and may be easily formed and assembled to contain the relevant portions of power plant 10. Because of space and weight concerns, materials having high "R" values per thickness are preferred.

In the embodiment of FIG. 1, the CSA 12, and the coolant/water management system 30 including the separator 34, of power plant 10 are all contained within a common insulating enclosure 64. A catalytic burner 66, supplied with hydrogen from $H_2$ source 25 and air from oxidant source 22, is positioned in direct convective communication with the interior of the insulating housing 64, preferably toward a lower end or region thereof, for convectively supplying heat to the interior of housing 64. In the present instance, the catalytic burner 66 is shown as being within insulated housing 64, though it might be located externally and communicate via a small inlet duct or hood in the lower portion of housing 64. This catalytic burner 66 and hydrogen source 25 and oxidant source 22 require no parasitic power, as a pump and/or blower. In this way, sufficient heat is efficiently supplied passively to the freeze-sensitive elements of power plant 10 from an existing fuel source to assure that those elements do not freeze for extended storage periods that may equal or exceed 7 days, under sub-freezing external conditions as cold as −40° C. An exhaust vent 68 is located in the upper region of the insulating housing 64 to vent gases combusted by burner 66 following release of some of their thermal energy to the contained elements of the power plant 10 to facilitate the convective flow. Similarly, to the extent such release of thermal energy by the combusted gases results in a condensation of the gases to liquid phase, such as water, that liquid is removed from insulating enclosure 64 via sump drain 70. Preferably, the gas and liquid vents or drains 68, 70, etc., include valves, covers, or caps which close them to the cold external conditions when burner 66 is not in use.

Referring to the catalytic burner 66 in greater detail, a catalyst surface 72 is provided over, or through, which the hydrogen is caused to flow. The catalyst surface 72 may be a screen, foam or similar support structure on which there is loaded an appropriate catalyst, such as platinum or other suitable noble metal. The hydrogen, in the presence of the catalyst surface 72 and air, undergoes a combustion-like reaction that is typically flameless and produces heat. The heat is released at a temperature under 1,000° F., typically in the range of 200°–700° F., and is preferable in this application to the much higher temperatures (e.g., several thousand degrees F.) otherwise released by a diffusion burner. The latter, higher, temperatures would be destructive of elements in the fuel cell power plant 10, and would require pre-cooling, which would be quite inefficient.

The hydrogen from supply 25 is typically pre-pressurized in storage, and is released to the burner 66, either continuously or intermittently, as determined by the temperature sensor(s) 62 and the programming of controller 63, which in turn controls a hydrogen supply control valve 67 via control line 69. A sensed temperature below the range of about 40°–45° F. is typically used to stimulate a demand for supplemental heat. That temperature threshold will be referred to herein as 5° C. The use of controller 63 and valve 67 may be the only electrical load on the system, and will be minimal and/or intermittent, at most. Similarly, the oxidant supply 22 will, or may, simply be drawn convectively from ambient external air by means of the heat of the combustion of the hydrogen at the catalyst surface 72. In this way, air is drawn into the reaction zone without requirement for further assistance from otherwise parasitic pumps or blowers. It is preferable if the air and hydrogen can be mixed for contact with the catalyst surface 72. The heated gas resulting from the combustion by the catalyst burner 66 is then convectively drawn upward into the relatively colder interior of enclosure 64 to provide the desired warming of the freeze-critical elements of the fuel cell power plant 10. The supply of air 22 to the burner 66 is normally sufficient to support the convective flow, however, provision for the further intake of supplemental air may be provided, if required.

The forgoing embodiment is directed to maintaining the cell stack assembly 12 above freezing temperature, e.g., at a minimum of about 5° C., at ambient temperatures as low as −40° C., and continue to allow boot-strap startup and then motive power within 10 seconds. The embodiment is independent of grid power and independent of the parasitic electrical loads, such as pumps and blowers, that would otherwise be required for "keep warm" operation for extended storage periods. This prevents the draining of a standard 12V (120 A-hr) automotive battery, which is typically a low capacity energy storage device (e.g., 1.44 kw-hr) and is not adequate for significant electrical heating during storage or for driving parasitic loads for any significant period.

Reference is made to FIG. 2 for a graphical depiction of the fraction of a typical hydrogen fuel tank required to maintain a fuel cell stack assembly from freezing for differing intervals and at several subfreezing temperatures and for differing thicknesses of the insulating housings, based on modeling projections. The hydrogen in a typical storage tank, when full, weighs about 1.6 kilogram (kg), or 3.5 lbs, and would be satisfactory for use with the 75 kw PEM fuel cell stack assembly (CSA) available from UTC Fuel Cells, LLC of South Windsor, Conn. The graph depicts the fraction of $H_2$ that is required to provide the energy levels (thermal equivalent) to maintain the CSA at a minimum of 5° C. The limited energy capacity of a 120 Ampere-hour battery is evident. On the other hand, for ambient thermal conditions ranging from −10° C. to −40° C., for insulation thickness ranging from 1 to 5 inches, and for storage intervals ranging from 1 to 7 days, it will be noted that the amount of $H_2$ required to maintain the CSA at 5° C. may range from well less than $1/16^{th}$ of a tank full (e.g., $1/100^{th}$ to $1/50^{th}$ of a tank full) for moderate cold, thick insulation, and 1 day storage, to one quarter of a tank under the severe conditions of extreme cold, thin insulation, and 7-day storage.

In an actual example, parameters of air flow and hydrogen flow were chosen such that the gas temperature at the exit from burner 66 was 250° F. when the temperature of the ambient incoming air was −40° F. The air flow was 10 pph and the hydrogen flow was 0.014 pph. The exhaust temperature from the insulating enclosure surrounding the stack assembly, as in FIG. 1, was about 50° F. On the other hand, with the same air and fuel flow rates, but with an incoming air temperature of about 30° F., the temperature at the burner exit was about 320° F. The hydrogen flow of 0.014 pph is equivalent to about 200 watts if the $H_2$ is completely burned. Clearly, the flow of H2 to catalytic burner 66 can/will be adjusted as external temperatures change, and such adjustment may be adjustment of the rate of a continuous flow, or intermittent flow at a constant rate, or a combination of the two. Indeed, even in the example given above, there may be no need for a continuous flow of H2 at the noted rate to maintain the stack at, or above, 5° C., even at −40° F.

It will thus be appreciated that the use of clean-burning, high-energy content, on-board hydrogen in the convective, catalytic burner arrangements of the invention provides an efficient and effective means for maintaining a fuel cell power plant readily operable for extended periods with little or no requirement to provide power to parasitic electrical loads.

Although the invention has been described and illustrated with respect to the exemplary embodiments thereof, it should be understood by those skilled in the art that the foregoing and various other changes, omissions and additions may be made without departing from the spirit and scope of the invention. Depending upon sensitivities of components of the power plant to the heated gases, the heat may be exchanged via a gas/air heat exchanger or the like. Depending on constraints in the physical arrangement of the power plant and/or the insulating enclosures, there may be multiple insulating enclosures each containing a freeze-sensitive portion of the power plant. Gas passage is provided between the insulating enclosures in the event a single burner is used to provide the convective flow of warm gas.

What is claimed is:

1. A keep warm system to provide freeze protection for a fuel cell power plant (10), comprising:
   a. a fuel cell stack assembly (CSA) (12) including an anode (16), a cathode (18), an electrolyte (14), and a cooler (20);
   b. fuel supply means (25) for providing a supply of fuel, at least some of the fuel being supplied as reactant to the anode (16);
   c. a source of oxidant reactant (22) operatively supplied to the cathode (18);
   d. a water management system (30, 28) operatively connected to the cooler (20) of the CSA (12);
   e. thermal insulating means (64) enclosing at least one of the CSA (12) and the water management system (30, 28) for providing thermal insulation thereof; and
   f. catalytic fuel burner means (66) operatively connected to the fuel supply means (25) and to the source of oxidant reactant (22) for catalytically reacting the fuel and oxidant and providing a source of heat, the burner means (66) being disposed and operative to supply heated gas into the thermal insulating enclosure means (64), and to the at least one of the CSA (12) and the water management system (30, 28) in the thermal insulating enclosure means (64), thereby to prevent freezing of water in freeze-sensitive parts of the fuel cell power plant.

2. The keep-warm system of claim 1 wherein the catalytic burner means (66) includes a catalytic surface (72) for combustively reacting the fuel in the presence of oxidant in a flameless manner to release heat only in a thermal range less than about 1000° F.

3. The keep-warm system of claim 2 wherein the heat released by catalytic combustion at the catalytic burner means (66) is in the thermal range of about 200°–700° F.

4. The keep-warm system of claim 2 wherein the source of oxidant reactant (22) is ambient air, the air being supplied to the catalytic burner means (66) and mixed with fuel from the fuel supply means (25) for combustively reacting the mixture in the presence of the catalytic surface (72) to release heat.

5. The keep-warm system of claim 1 wherein the fuel supply means (25) comprises a container of hydrogen stored under pressure.

6. The keep-warm system of claim 1 wherein both the CSA (12) and the water management system (28, 30) are substantially enclosed by the thermal insulating means (64).

7. The keep-warm system of claim 4 wherein the electrolyte (14) of the CSA (12) is a proton exchange membrane (PEM), the fuel from the fuel supply means (25) is hydrogen, and the heat released by catalytic combustion at the catalytic burner means (66) is in the thermal range of about 200°–700° F.

8. In a fuel cell power plant (10) having a fuel cell stack assembly (GSA) (12) including an anode (16), a cathode (18), and an electrolyte (14), a fuel supply (25) for providing fuel to at least the anode (16), a source of oxidant reactant (22) for supplying at least the cathode (18), and a water management system (30, 28) operatively connected to the CSA (12), the method of preventing freezing of water in freeze-sensitive parts of the fuel cell power plant (10) during shutdown, comprising the steps of:
   a. selectively flowing (62, 63, 69, 67) fuel (25) and oxidant (22) to a catalytic fuel burner (66) during shutdown for catalytic combustion to provide heated gas;
   b. convectively flowing the heated gas into heat transfer relation with the freeze-sensitive parts of the fuel cell power plant (10) to provide heat thereto; and
   c. thermally insulating the freeze-sensitive parts of the fuel cell power plant (10) including the heated gas flowing in heat transfer relation therewith.

9. The method of claim 8 wherein the step of selectively flowing fuel and oxidant to a catalytic fuel burner provides heated gas in a thermal range of about 200°–700° F.

10. The method of claim 8 wherein the step of thermally insulating the freeze-sensitive parts of the fuel cell power plant (10) comprises thermally insulating both the GSA (12) and the water management system (28, 30).

11. A keep-warm system to provide freeze protection for a fuel cell power plant (10), comprising:
   a. a fuel cell stack assembly (GSA) (12) including an anode (16), a cathode (18), and an electrolyte (14);
   b. fuel supply means (25) for providing a supply of fuel, at least some of the fuel being supplied as reactant to the anode (16);
   c. a source of oxidant reactant (22) operatively supplied to the cathode (18);
   d. a water management system (30, 28) operatively connected to the GSA (12);
   e. thermal insulating means (64) enclosing at least one of the GSA (12) and the water management system (30, 28) for providing thermal insulation thereof; and
   f. catalytic fuel burner means (66) operatively connected to the fuel supply means (25) and to the source of oxidant reactant (22) for catalytically reacting the fuel and oxidant and providing a source of heat, the burner means (66) being disposed and operative to supply heated gas into the thermal insulating enclosure means (64), and to the at least one of the GSA (12) and the water management system (30, 28) in the thermal insulating enclosure means (64), thereby to prevent freezing of water in freeze-sensitive parts of the fuel cell power plant.

12. The keep-warm system of claim 11 wherein the catalytic burner means (66) includes a catalytic surface (72) for combustively reacting the fuel in the presence of oxidant in a flameless manner to release heat only in a thermal range less than about 1000° F.

13. The keep-warm system of claim 12 wherein the catalytic burner means (66) is separate from the GSA (12).

14. The keep-warm system of claim 13 wherein the CSA (12) includes a cooler (20) and the water management system (30, 28) is operatively connected to the cooler (20) of the GSA (12).

15. The keep-warm system of claim 12 wherein the heat released by catalytic combustion at the catalytic burner means (66) is in the thermal range of about 200°–700° F.

16. The keep-warm system of claim 12 wherein the source of oxidant reactant (22) is ambient air, the air being supplied to the catalytic burner means (66) and mixed with fuel from the fuel supply means (25) for combustively reacting the mixture in the presence of the catalytic surface (72) to release heat.

17. The keep-warm system of claim 11 wherein the fuel supply means (25) comprises a container of hydrogen stored under pressure.

18. The keep-warm system of claim 11 wherein both the CSA (12) and the water management system (28, 30) are substantially enclosed by the thermal insulating means (64).

19. The keep-warm system of claim 11 wherein, for a system scaled commensurately with a consumption by catalytic fuel burner means (66) of not more than about 0.014 pph of hydrogen for about a 75 kw PEM fuel cell stack assembly, the insulation value of the thermal insulating means (64), as determined by at least the "R" value and thickness of said thermal insulating means, is sufficient to prevent freezing of water in freeze-sensitive parts of the plant for at least several days at external temperatures as low as −40° C.

20. The keep-warm system of claim 19 wherein the electrolyte (14) of the CSA (12) is a proton exchange membrane (PEM), the fuel from the fuel supply means (25) is hydrogen, and the heat released by catalytic combustion at the catalytic burner means (66) is in the thermal range of about 200°–700° F.

* * * * *